United States Patent [19]

Towersey et al.

[11] 4,041,189

[45] Aug. 9, 1977

[54] PRODUCTION OF EDIBLE PROTEIN CONTAINING SUBSTANCES

[75] Inventors: Peter John Towersey, High Wycombe; John Longton, Chesham; Geoffrey Norman Cockram, Henley-on-Thames, all of England

[73] Assignee: Ranks Hovis McDougall Limited, London, England

[21] Appl. No.: 507,123

[22] Filed: Sept. 18, 1974

[30] Foreign Application Priority Data

Sept. 24, 1973 United Kingdom ............... 44708/73

[51] Int. Cl.² .............................................. C12B 1/00
[52] U.S. Cl. ........................................ 426/656; 195/5; 260/112 R; 426/60
[58] Field of Search .......................... 195/81, 28 N, 5; 260/112 R; 426/364, 60, 656

[56] References Cited

U.S. PATENT DOCUMENTS

| 2,450,055 | 9/1948 | Nord | 195/81 X |
|---|---|---|---|
| 3,775,393 | 11/1973 | Akin et al. | 260/112 R |
| 3,784,536 | 1/1974 | Akin et al. | 260/112 R |
| 3,809,776 | 5/1974 | Chao | 195/2 |
| 3,937,654 | 2/1976 | Solomons et al. | 195/115 X |

Primary Examiner—Raymond N. Jones
Assistant Examiner—R. B. Penland
Attorney, Agent, or Firm—Stevens, Davis, Miller & Mosher

[57] ABSTRACT

A process for reducing the nucleic acid content in the production of an edible protein-containing substance which comprises maintaining a grown non-toxic micro-fungus of the class Fungi Imperfecti, preferably a strain of *Fusarium graminearum* Schwabe, in a suspension at a pH between 4.7 and 7.0 and at a temperature between 55° and 72° C. for a time of at least 60 seconds.

8 Claims, No Drawings

PRODUCTION OF EDIBLE PROTEIN CONTAINING SUBSTANCES

This invention is for improvements in or relating to the production of edible protein containing substances.

It has particular reference to a process for reducing the nucleic acid content of microfungi.

British Pat. No. 1,210,356 describes and claims a process for the production of an edible protein-containing substance which comprises incubating and proliferating, under aerobic conditions, an organism which is a non-toxic strain of a microfungus of the class Fungi Imperfecti, in a culture medium containing essential growth-promoting nutrient substances, of which carbon in the form of assimilable carbohydrate constitutes the limiting substrate in proliferation, and separating from the assimilable carbohydrate exhausted medium the proliferated organism which constitutes the edible protein-containing substance.

British Pat. No. 1,346,062 describes and claims a process for the production of an edible protein-containing substance which comprises incubating and proliferating, under areobic conditions, a non-toxic strain of the genus Fusarium or a variant or mutant thereof, in a culture medium containing essential growth-promoting nutrient substances, of which carbon in the form of assimilable carbohydrate constitutes the limiting substrate in proliferation, and separating the proliferated organism comprising the edible protein-containing substance.

British Pat. No. 1,346,061 describes and claims our specific novel strain of *Fusarium graminearum* Schwabe IMI 145425 and variants and mutants thereof.

The separated proliferated organism comprising the edible protein-containing substance obtained by the fermentation process of British Patent No. 1,346,062 (Ser. No. 1,331,471) and 30584/70 and Cognate No. 10466/71 may be incorporated into a foodstuff for human or animal consumption.

The process of British Pat. No. 1,346,062 (Ser. No. 1,331,471) and 30584/70 and Cognate No. 10466/71 are capable of producing an edible protein-containing substance comprising fungal mycelium which possesses a high net protein utilisation value on rat assays of at least 70 based on the α-amino nitrogen.

If single-cell protein is to be used as a primary protein source for human consumption the Protein Advisory Group of the Food and Agricultural Organization (FAO)/Work Health Organization (WHO) has advised that the nucleic acid content should be reduced to a level which would allow a maximum intake in the range of 2 grams of nucleic acid per day.

For a processing method to be acceptable, it must not only decrease the nucleic acid level to the required degree, but it also must be inexpensive and must not contaminate the food product with undesirable chemicals.

It is an object of the present invention to provide a process for the reduction of levels of nucleic acid in particular ribonucleic acid (RNA) in proliferated microogranisms combined with the minimum loss of protein to render them more acceptable as human food.

We have developed a process for treating cells of grown non-toxic microfungus of the class Fungi Imperfecti which can meet the above requirements of the Protein Advisory Group.

The invention provides fungal mycelium possessing a reduced level of RNA of below 4%.

Thus the invention provides fungal mycelium containing *Fusarium graminearum* Schwabe IMI 145425 possessing a reduced level of RNA of below 3% by weight, preferably below 2% by weight. This strain has also been deposited with the American Type Culture Collection and assigned the number ATCC 20334.

According to the present invention there is provided a process for reducing the nucleic acid content in the production of an edible protein-containing substance which comprises maintaining a grown nontoxic microfungus of the class Fungi Imperfecti in a suspension at a pH between 4.7 and 7.0 and at a temperature between 55° and 72° C. for a time of at least 60 seconds.

The process may be applied to a grown non-toxic strain of Fusarium.

The strain of Fusarium may be a strain of *Fusarium graminearum* Schwabe in particular IMI 145425, *Fusarium oxysporum* or *Fusarium solani* as described and claimed in British Pat. Nos. 1,346,061 and 1,346,062.

The grown non-toxic microfungus of the class Fungi Imperfecti may conveniently be maintained in a suspension at a pH between 4.7 and 7.0 and at a temperature between 55° and 68° C. for a time of at least 200 seconds.

The post fermentation process of the present invention for reducing the nucleic acid content of microorganisms is essentially a single-stage process.

The grown microbial protein or fungal mycelium obtained for example by the fermentation process described and claimed in British Patent No. 1,346,062, may be harvested, filtered to remove growth medium and washed, if desired. The cells may then be brought into intimate contact with aqueous buffer solutions in the pH range 4.7 to 7.0. Thus the cells may then be resuspended and incubated in tap water at pH 6.3 and temperature 63° C. for a period of 20 minutes.

The resulting treated cells may then be harvested again for example by filtration and wasing with water and thereafter formulated into foods or dried by various methods.

In order to confine the loss of protein to a minimum it is desirable to raise the temperature of the cell suspension to a given temperature within the range of 55° and 72° C. as rapidly as possible; substantially the same temperature may subsequently be maintained for a period of 5 to 60 minutes.

An optional prior step designed to inhibit or destroy the proteolytic activity comprises maintaining a grown non-toxic microfungus of the class Fungi Imperfecti at the selected isothermal temperature of between 55° and 72° C. at a pH where there is no proteolytic activity for a time sufficient to destroy the protease but not the ribonuclease.

Thus with a view to improving the protein economy of the present isothermal process the cells may be held at a pH of 8.5 at the selected isothermal temperature, preferably 65° C., for a duration of between ½ minute and 5 minutes, preferably 1 minute before the isothermal process is commenced (i.e. with an adjustment of the pH to between 4.7 and 7).

The resulting fungal mycelium may have an RNA content of 1 to 4% compared to 7 to 12% of the untreated proliferated organism. In certain instances the RNA content may be less than 1%.

The cells may be analysed to determine their chemical composition and to evaluate the efficiency of the nucleic acid reduction process.

Following is a description of methods of determining the chemical composition.

References to "Biomass Loss" denote weight loss during processing.

Ribonucleic acid (RNA) content is determined by a modification of the method of Schneider, W.C. Analyst, 1945, 161, 293.

Method of analysis for Total Nitrogen (TN) Automatic Kjeldahl digester (Technicon). A. Ferrari, Ann. N.Y. Sci 87, 792.

Amino nitrogen (AN) TNBS (modified). M.A. Pinnegar, Technicon Symposium 1965, p.80.

Following is a description by way of example of methods of carrying the invention into effect.

*Fusarium graminearum* IMI 145425 was cultivated continuously by the following procedure:

| Medium in tap water. | |
|---|---|
| Potato Starch (treated with α-amylase and glucamylase) | 60 g/l |
| $MgSO_4\,7H_2O$ | 0.75 g/l |
| $ZnSO_4\,7H_2O$ | 10.0 mg/l |
| $CuSO_4\,5H_2O$ | 2.0 mg/l |
| $NaMoO_4\,2H_2O$ | 2.0 mg/l |
| $CoCl\,6H_2O$ | 2.0 mg/l |
| $MnSO_4\,4H_2O$ | 10.0 mg/l |
| $FeSO_4\,7H_2O$ | 20.0 mg/l |
| $NH_4H_2PO_4$ | 3.0 g/l |
| $K_2SO_4$ | 2.4 g/l |
| NaCl | 0.125 g/l |
| Boric acid | 0.5 mg/l |
| Biotin | 0.005 mg/l |
| PPG 2000 | 0.04 mg/l |

| Fermenter operation conditions | |
|---|---|
| Temperature | 30° C |
| pH | 6.0 |
| Pressure | 15.5 psig |
| Stirrer speed | 230 rpm |
| Air flow | 800 l/minute |
| Dissolved oxygen | 6.5 (arbitrary units where air saturation is 80) |
| Sterilization Temperature | 135° C by continuous sterilization (90 secs holding time) |
| Dilution rate | 0.14 $hr^{-1}$ |
| Fermenter Volume | 1300 l |

Inoculum:- Prior to continuous growth the fermenter was operated in a batch fashion from a 20 l inoculum of a growing culture. When batch growth was complete the fermenter was put on stream under the above conditions.

Note

In some of the examples which follow the % RNA content is not corrected for "Biomass Loss".

e.g. 100g cells —RNA Reduction process→ 70g treated cells + 30 g Biomass Loss (Containing say 10g RNA) (Containing say 2g RNA)

The % RNA content not corrected for Biomass Loss is 2% (ie 2 g from the original 100g of cells)

Whereas the % RNA corrected for Biomass Loss is 2/70 × 100 = 2.86% (ie 2g in a final 70g of product)

The Isothermal Process like other RNA reduction processes generally results in approximately 30% Biomass loss. However because the biomass loss is not generally determined on each sample it becomes necessary to quote RNA content of the product as a function of the starting material.

EXAMPLE A

THE NUCLEIC ACID REDUCTION PROCESS STUDIED AT VARIOUS TEMPERATURES

*F. graminearum* IMI 145425, cultivated as described earlier was harvested and washed on a Buchner filtration system. The cells were suspended at a slurry concentration of approximately 10g/1 in tap water at various temperatures for various durations.

Results

| Treatment | Temperature of Incubation ° C. | Duration of Incubation - minutes | % RNA Content (Not corrected for Biomass Loss) | % of the original RNA remaining |
|---|---|---|---|---|
| Control | — | — | 8.09 | 100 |
| Nucleic Acid reduction | 55 | 5 | 8.09 | 100 |
| " | 55 | 10 | 6.58 | 81 |
| " | 55 | 20 | 3.40 | 42 |
| " | 55 | 40 | 1.16 | 14 |
| " | 55 | 60 | 0.80 | 10 |
| Control | — | — | 7.56 | 100 |
| Nucleic Acid reduction | 58 | 5 | 6.26 | 83 |
| " | 58 | 10 | 3.55 | 47 |
| " | 58 | 20 | 1.79 | 24 |
| " | 58 | 30 | 1.21 | 16 |
| " | 58 | 45 | 0.88 | 12 |
| Control | — | — | 10.84 | 100 |
| Nucleic Acid reduction | 60 | 5 | 8.15 | 75 |
| " | 60 | 10 | 4.92 | 45 |
| " | 60 | 20 | 2.39 | 22 |
| " | 60 | 30 | 1.68 | 15 |
| " | 60 | 45 | 1.29 | 12 |
| Control | — | — | 9.85 | 100 |
| Nucleic Acid Reduction | 62 | 1 | 11.25 | — |
| " | 62 | 5 | 6.37 | 65 |
| " | 62 | 10 | 4.19 | 43 |
| " | 62 | 20 | 2.30 | 23 |
| " | 62 | 30 | 1.83 | 19 |
| Control | — | — | 11.34 | 100 |
| Nucleic Acid Reduction | 64 | 1 | 11.96 | — |
| " | 64 | 5 | 6.12 | 54 |
| " | 64 | 10 | 4.10 | 36 |
| " | 64 | 20 | 2.70 | 24 |
| " | 64 | 30 | 2.39 | 21 |
| Control | — | — | 8.22 | 100 |
| Nucleic Acid Reduction | 66 | 1 | 7.03 | 86 |
| " | 66 | 5 | 3.13 | 38 |
| " | 66 | 10 | 2.29 | 28 |
| " | 66 | 20 | 1.99 | 24 |
| " | 66 | 30 | 2.18 | 27 |
| Control | — | — | 8.47 | 100 |
| Nucleic Acid Reduction | 68 | 1 | 6.78 | 80 |
| " | 68 | 5 | 3.03 | 36 |
| " | 68 | 10 | 2.56 | 30 |
| " | 68 | 20 | 2.44 | 29 |
| " | 68 | 30 | 2.36 | 28 |
| Control | — | — | 7.51 | 100 |
| Nucleic Acid Reduction | 70 | 1 | 3.29 | 44 |
| " | 70 | 5 | 2.65 | 35 |
| " | 70 | 10 | 2.40 | 32 |
| " | 70 | 20 | 2.33 | 31 |
| " | 70 | 30 | 2.22 | 30 |
| Control | — | — | 7.62 | 100 |
| Nucleic Acid Reduction | 72 | 1 | 5.35 | 70 |
| " | 72 | 5 | 2.74 | 36 |
| " | 72 | 10 | 2.43 | 32 |
| " | 72 | 20 | 2.33 | 31 |
| " | 72 | 30 | 2.33 | 31 |
| Control | — | — | 9.16 | 100 |
| Nucleic Acid Reduction | 75 | 1 | 6.02 | 66 |
| " | 75 | 5 | 5.10 | 57 |
| " | 75 | 10 | 5.04 | 55 |
| " | 75 | 20 | 4.73 | 52 |
| " | 75 | 30 | 4.49 | 49 |
| Control | — | — | 8.72 | 100 |
| Nucleic Acid Reduction | 80 | 1 | 5.69 | 65 |
| " | 80 | 5 | 5.26 | 60 |
| " | 80 | 10 | 5.11 | 59 |
| " | 80 | 20 | 4.57 | 52 |
| " | 80 | 30 | 4.51 | 52 |

Conclusions

With mould cultivated in the manner described it is possible to reduce the nucleic acid level to acceptably low values within the temperature range 55° – 72° C.

The ideal isothermal temperature depends on the extent of RNA removal desired and the duration which can be tolerated on economic grounds.

The preferred conditions for our purposes are pH 6, 62.5° C. for 18 minutes (see also Example B).

EXAMPLE B

EFFICIENCY OF NUCLEIC ACID REDUCTION OVER A pH RANGE OF 4–9.5 AT 62.5

*F. graminearum* IMI 145425, cultivated as described earlier was harvested and washed on a Buchner filtration system. The cells were suspended in tap water at 62.5° C. and a slurry concentration of approximately 10g/l. The pH was controlled at the desired value by automatic addition of either HCl or $NH_4OH$. Samples were incubated for 18 minutes.

Results

| Treatment | pH of incubation | Duration of incubation minutes | % of RNA in product | % AN | % TN | % Biomass Loss | % of the original RNA remaining | % of the original AN remaining in the product |
|---|---|---|---|---|---|---|---|---|
| Control | — | — | 8.24 | 5.9 | 7.68 | — | 100 | 100 |
| Isothermal at 62.5° C | 9.5 | 18 | 7.31 | 6.27 | 8.60 | 23.9 | 67.5 | 81 |
| " | 9.0 | 18 | 8.36 | 6.36 | 8.77 | 21.4 | 79.7 | 84.7 |
| " | 8.5 | 18 | 8.29 | 6.31 | 8.52 | 20.8 | 79.7 | 84.7 |
| " | 8.0 | 18 | 8.28 | 6.19 | 8.41 | 21.4 | 79.0 | 82.5 |
| " | 7.0 | 18 | 2.06 | 6.34 | 7.74 | 28.3 | 17.9 | 77.0 |
| " | 6.0 | 18 | 1.01 | 6.46 | 7.80 | 31.4 | 8.4 | 75.1 |
| " | 5.0 | 18 | 1.39 | 6.48 | 7.95 | 32.1 | 11.4 | 74.6 |
| " | 4.0 | 18 | 7.26 | 6.48 | 8.49 | 27.7 | 63.7 | 79.4 |

Conclusions
1. The pH optimum for the process carried out at 62.5° C. is in the range pH 4.7 – 7.0. Maximum reduction was at pH 6.0.
2. Unfortunately, optimum pH for protein retention is not pH 6.0 but pH 8.5–9.0.
3. Observations on colors: The dried solids, moist filter cakes and slurries at pH's of 6.0 and above were dark grey. Those at pH 5.0 were fawn, and at pH 4.0 the material was white. After the RNA reduction has been accomplished it may therefore be desirable to adjust the pH to 4.0 to obtain a white product.

EXAMPLE C

EFFICIENCY OF NUCLEIC ACID REDUCTION CARRIED OUT IN SOLUTIONS OF VARYING IONIC STRENGTHS

*F. graminearum* IMI 145425, cultivated as described earlier was harvested and washed on a Buchner filtration system. The cells were suspended at a slurry concentration of approximately 10g/l in solutions of varying ionic strengths. The pH was automatically maintained at pH 6 and the incubation was carried out at 62.5° C. for a duration of 20 minutes.

Results

| Treatment | Incubation Solution (maintained at pH 6) | % RNA in product | % Amino Nitrogen | % Total Nitrogen |
|---|---|---|---|---|
| Control | — | 8.58 | 6.63 | 8.85 |
| Nucleic Acid Reduction | Distilled water | 1.50 | 7.12 | 8.69 |
| Nucleic Acid Reduction | 0.01M NaCl | 1.18 | 6.98 | 8.81 |
| Nucleic Acid Reduction | 0.05M NaCl | 1.05 | 6.99 | 9.04 |
| " | 0.10M NaCl | 1.04 | 7.06 | 8.96 |
| " | 0.20M NaCl | 0.87 | 6.69 | 8.64 |
| " | 0.50M NaCl | 0.91 | 6.77 | 8.50 |
| " | 0.50M $NH_4Cl$ | 0.62 | 7.02 | 8.64 |

Conclusions

In the range studied NaCl and $NH_4Cl$ had little effect on the nucleic acid reduction process.

EXAMPLE D

EFFICIENCY OF NUCLEIC ACID REDUCTION AT VARIOUS SLURRY CONCENTRATIONS

*F. graminearum* IMI 145425, cultivated as described earlier was harvested and washed on a Buchner filtration system. The cells were suspended at various slurry concentrations in tap water at 63° C. for various durations.

Results

| Treatment | Slurry Concentration g/l | Time of Incubation (minutes-seconds) | % RNA Content (Not corrected for biomass loss) |
|---|---|---|---|
| None(Control) | None | None | 8.85 |
| Nucleic Acid Reduction | 1 | 1.00 | 7.46 |
| " | 1 | 7.20 | 3.27 |
| " | 1 | 15.30 | 2.37 |
| " | 1 | 30.30 | 1.85 |
| " | 2 | 1.00 | 6.87 |
| " | 2 | 7.20 | 2.34 |
| " | 2 | 16.30 | 1.41 |
| " | 2 | 31.00 | 1.31 |
| " | 4 | 1.00 | 7.17 |
| " | 4 | 8.00 | 2.50 |
| " | 4 | 16.20 | 1.34 |
| " | 4 | 30.10 | 0.91 |
| " | 10 | 2.00 | 7.35 |
| " | 10 | 9.40 | 2.02 |
| " | 10 | 18.00 | 1.10 |
| " | 10 | 30.20 | 0.76 |
| " | 20 | 2.20 | 6.05 |
| " | 20 | 6.40 | 3.13 |
| " | 20 | 16.20 | 1.59 |
| " | 20 | 30.00 | 0.88 |
| " | 40 | 1.20 | 5.31 |
| " | 40 | 5.10 | 5.25 |
| " | 40 | 15.00 | 1.68 |
| " | 40 | 30.50 | 1.02 |

Conclusion

The results show that broadly speaking slurry concentration only affects RNA reduction in as much as heat transfer is affected (i.e. high slurry concentrations may require stirring to ensure rapid temperature equilibration).

EXAMPLE E

EFFICIENCY OF NUCLEIC ACID REDUCTION UNDER VARIOUS AGITATION CONDITIONS

*F. graminearum* IMI 145425, cultivated as described earlier was harvested and washed on a Buchner filtration system. The cells were suspended at approximately 10g/liter in tap water at 63° C. under various agitation conditions.

Results

| Treatment | Agitation in Grant Water Bath strokes/minute | Duration of incubation minutes | % RNA Content (Not corrected for Biomass Loss) |
|---|---|---|---|
| None(Control) | None | None | 8.30 |
| Nucleic Acid Reduction | Zero | 1 | 7.31 |
| " | " | 5 | 2.33 |
| " | " | 10 | 1.04 |
| " | " | 20 | 0.67 |
| " | " | 30 | 0.59 |
| " | 50 | 1 | 7.44 |
| " | " | 5 | 2.59 |
| " | " | 10 | 1.23 |
| " | " | 20 | 0.84 |
| " | " | 30 | 0.74 |
| " | 250 | 1 | 6.26 |
| " | " | 5 | 2.10 |
| " | " | 10 | 1.37 |
| " | " | 20 | 1.13 |
| " | " | 30 | 1.13 |

Conclusion

The results show that it is not necessary to stir the slurry during the Isothermal process. The effect of shaking at this slurry concentration is negligible. This has tremendous implications from the chemical engineering point of view when scale-up to larger plant is carried out.

EXAMPLE F

TYPICAL NUCLEIC ACID REDUCTION EXPERIMENT

*F. graminearum* IMI 145425, cultivated as described earlier was harvested and washed on a Buchner filtration system. The cells were resuspended at a slurry concentration of approximately 10g/l in a solution of 0.1M NaCl. The pH was automatically maintained at pH 6 and the incubation was carried out at 62.5° C for a duration of 20 minutes.

Results

| 100 g of fungus containing | | 68.1 g product | 31.9 g Biomass Lost |
|---|---|---|---|
| 37.30 g protein | | 30.00 g protein + | |
| 4.70 g amino acids | isothermal process → | — | |
| 8.58 g RNA | | 0.71 g RNA | |

Conclusion

The product contains 44% protein and 0.8% ribonucleic acid i.e. a protein to nucleic acid ratio of 55:1. The starting material contains 37.3% protein and 8.58% ribonucleic acid i.e. a protein to nucleic acid ratio of 4.35:1.

EXAMPLE G

AN OPTIONAL PRIOR PROCESS DESIGNED TO DESTROY THE PROTEASE ACTIVITY WITHOUT SUBSTANTIALLY DESTROYING THE RIBONUCLEASE ACTIVITY

*F. graminearum* IMI 145425, cultivated as described earlier was harvested and washed on a Buchner filtration system. The cells were suspended in distilled water at 65° C. and a slurry concentration of approximately 10 g/l. The pH was controlled at 8.5 for various times.

After this prior treatment the cells were subjected to RNA removal by the isothermal process at 65° C., pH 6 for 20 minutes.

Results

| Treatment | % of RNA in product | % AN in product | % TN in product | % Biomass Loss |
|---|---|---|---|---|
| Control | 8.37 | 6.26 | 8.31 | Zero |
| ½ minutes at pH 8.5 + 20 min pH6 | 1.09 | 7.03 | 9.12 | 43.4 |
| 1 minutes at pH 8.5 + 20 min pH6 | 1.31 | 7.23 | 9.49 | 35.0 |
| 2 minutes at pH 8.5 + 20 min pH6 | 1.52 | 7.21 | 9.38 | 35.4 |
| 5 minutes at pH 8.5 + 20 min pH6 | 2.52 | 7.24 | 9.38 | 31.4 |

Conclusions

The optimal example which removes the maximum quantity of RNA but at the same time retains maximal Biomass and amino nitrogen is fulfilled by conditions of 1 minutes at 65° C. and pH 8.5 followed by the isothermal process at 65° C. pH 8.5 for 20 minutes.

EXAMPLES OF SUCCESSFUL REDUCTION OF THE NUCLEIC ACID LEVELS IN VARIOUS MICRO-ORGANISMS OTHER THAN *FUSARIUM GRAMINEARUM* IMI 145425

EXAMPLE H

*Fusarium solani* IMI 154217 (also deposited in the American Type Culuture Collection and assigned the number ATCC 20328) was cultivated by the following procedure:

| Medium in distilled water: | |
|---|---|
| Mg $SO_4 \cdot 7H_2O$ | 0.25 g/liter |
| $KH_2PO_4$ | 15.0 g/liter |
| $(NH_4)_2SO_4$ | 2.83 g/liter |
| Biotin | 0.05 ml/liter (of stock solution 1 mg/ml) |
| Choline | 50 mg/liter |
| Trace elements | 5 ml/liter (STOCK SOLUTION) |
| NaOH | 1 g/liter → pH6.0 |
| Glucose | 10% solution (20 mls added after sterilization) |
| Minimal Salts or Trace element stock solution | |
| $ZnCl_2$ | 1 g/liter |
| $MnCl_2$ $4H_2O$ | 1 g/liter |
| $FeCl_3$ $6H_2O$ | 2 g/liter |
| $CuCl_2$ $2H_2O$ | 0.2 g/liter |
| NaMn $O_4$ $2H_2O$ | 0.2 g/liter |
| $CoCl_2$ $6H_2O$ | 0.2 g/liter |
| $CaCl_2$ $2H_2O$ | 2 g/liter |

Sterilisation

All components with the exception of glucose were sterilised together, and the quantity of these materials required for 1 liter of medium were dissolved, made up to 850 ml and distributed in 5 1 liter conical flasks, each containing 170 ml. A .10% w/v solution of glucose was prepared and sterilized in 20 ml portions in universal bottles. Sterilisation was effected in an autoclave at 15 p.s.i. for 15 minutes.

Growth Conditions

Before inoculation with 10 ml of a spore suspension, the contents of one bottle of sterile glucose solution were added to each flask. Culture of the organism then proceeded on an Orbital Shaker, with 2 inch throw, at 160 r.p.m. and a temperature of 30° C. The culture was harvested after 48 hours.

Nucleic Acid Reduction Process

Cells were collected and washed on a Buchner filtration system and suspended at a slurry concentration of approximately 10 g/liter in tap water at 64° C. and the pH adjusted to 6 with NaOH and $H_2SO_4$.

Results

| Microfungi | Treatment | Time of incubation | % RNA content | % amino nitrogen |
|---|---|---|---|---|
| F.solani | None | None | 5.15 | 5.4 |
| | Nucleic Acid Reduction | 10 | 2.95 | 5.92 |
| | " | 20 | 0.67 | 6.11 |
| | " | 30 | 0.55 | 6.00 |

Conclusion

The level of Nucleic acid was effectively reduced by the treatment described.

EXAMPLE I

*Fusarium oxysporum* IMI 154214 (also deposited in the American Type Culture Collection and assigned the number ATCC 201281) was cultivated in a similar manner to that described for F. solani except that the growth medium contained 0.5 g/liter oxoid yeast extract and 0.5 g/liter mycological peptone in addition to the chemicals listed in Example H.

The cells were harvested after 72 hours and the nucleic acid reduction process conducted as in the previous example.

Results

| Microfungi | Treatment | Time of incubation minutes | % RNA content | % amino nitrogen |
|---|---|---|---|---|
| F. oxysporum | None | None | 6.57 | 6.28 |
| | Nucleic Acid Reduction | 10 | 1.00 | 7.47 |
| | " | 20 | 0.65 | 7.45 |
| | " | 30 | 0.54 | 7.53 |

Conclusion

The level of Nucleic acid was effectively reduced by the treatment described.

EXAMPLE J

THE NUCLEIC ACID REDUCTION PROCESS AS CARRIED OUT IN PILOT PLANT

*F. graminearum* IMI 145425, cultivated as described earlier was processed without separation from the growth medium as follows:

1. Mycelium slurry at a concentration of 20 grams per liter exists from the fermenter at a temperature of 30° C. and a pH of 6 and enters a mono-pump.
2. The mycelial slurry is pumped to a stream injector and the temperature of the material raised from 30° C. to 64° C. rapidly, the duration of the temperature rise, preferably being instantaneous (in practice being less than 5 seconds).
3. The material now at 64° C. and pH 6 is moved through a pipe and its temperature maintained for a duration of 45 minutes.
4. The material is passed through a heat exchanger to cool to approximately 20° C (to reduce the possibility of later microbial infection).
5. The slurry is passed into the trough of a rotary vacuum filter.
6. Liquid is drawn through a filter belt and the mycelium accumulates on the filter. The filter drum rotates above the liquid level carrying the mycelial cake.
7. The filter cake is washed with about 2 bed volumes of water. The filter drum continues to rotate and a vacuum pulls the cake to about 70% moisture by weight.
8. The mycelial cake is scraped off the drum.
9. The cake is reslurried in water and spray dried.

Results

| Treatment | % RNA Content | % Amino Nitrogen Content | % Total Nitrogen Content |
|---|---|---|---|
| Dry untreated material | 8.22 | 6.45 | 8.74 |
| Dry nucleic acid reduced material | 0.43 | 6.86 | 8.30 |

Conclusion

The nucleic acid content is effectively reduced by the process described.

In the fermentation operation conditions it is possible to employ a higher dilution rate of up to 0.20 hrs$^{-1}$, for example 0.17 hrs$^{-1}$.

We claim:

1. A process for reducing the nucleic acid content in the production of an edible protein-containing substance which comprises maintaining cells of a grown non-toxic strain of Fusarium microfungus of the class Fungi Imperfecti in a suspension at a pH between 4.7 and 7.0 and at a temperature between 55° and 72° C for a time of at least 60 seconds and sufficient to reduce the nucleic acid content to below 4%.

2. A process as claimed in claim 1 wherein the strain of Fusarium is a strain of *Fusarium graminearum* Schwabe, *Fusarium oxysporum* or *Fusarium solani*.

3. A process as claimed in claim 2 wherein the strain of *Fusarium graminearum Schwabe* is our strain of *Fusarium graminearum* Schwabe deposited with the Commonwealth Mycological Institute and assigned the number IMI 145425 (A.T.C.C. No. 20334).

4. A process as claimed in claim 1, wherein cells of the grown non-toxic microfungus are held at a pH of 8.5 at a selected isothermal temperature of 65° C. for a duration of between ½ minute and 5 minutes before adjustment of the pH to between 4.7 and 7.

5. A process as claimed in claim 1 wherein the temperature of cells of the grown non-toxic microfungus in the suspension is raised rapidly to a given temperature within the range of 55 and 72° C. and substantially the same temperature is subsequently maintained for a period of 5 to 60 minutes whereby a highly proteinaceous material having a reduced level of RNA of below 4% is obtained.

6. A process as claimed in claim 1 wherein the grown non-toxic strain of Fusarium microfungus of the class Fungi Imperfecti is maintained in a suspension at a pH between 4.7 and 7.0 and at a temperature between 55 and 68° C. for between 200 seconds and 30 minutes.

7. An edible protein-containing substance obtained by maintaining cells of a grown non-toxic strain of Fusarium microfungus of the class Fungi Imperfecti in a suspension at a pH between 4.7 and 7.0 and at a temperature between 55 and 72° C for a time of at least 60 seconds and sufficient to reduce the nucleic acid content to below 4%.

8. An edible protein-containing substance as claimed in claim 7 wherein the strain of Fusarium is our strain of *Fusarium graminearum* Schwabe deposited with the Commonwealth Mycological Institute and assigned the number IMI 145425 (A.T.C.C. No. 20334).

* * * * *

UNITED STATES PATENT AND TRADEMARK OFFICE
CERTIFICATE OF CORRECTION

PATENT NO. : 4,041,189
DATED : August 9, 1977
INVENTOR(S) : Peter John TOWERSEY, et al It is certified that error appears in the above-identified patent and that said Letters Patent are hereby corrected as shown below:

Column 1, lines 39-40, delete "(Ser. No. 1,331,471) and 30584/70 and Cognate No. 10466/71"

Column 1, lines 42-43, delete "(Ser. No. 1,331,471) and 30584/70 and Cognate No. 10466/71"

Column 8, line 28, change "20328" to --20327--.

Column 9, line 17, change "201281" to --20328--.

Signed and Sealed this

Ninth Day of May 1978

[SEAL]

Attest:

RUTH C. MASON
Attesting Officer

LUTRELLE F. PARKER
Acting Commissioner of Patents and Trademarks